Nov. 25, 1930.   M. A. LAHR   1,782,827
WHEEL ALIGNER
Filed March 15, 1929   2 Sheets-Sheet 2

INVENTOR
Marcus A. Lahr
Hull, Brock & West
ATTORNEY

Patented Nov. 25, 1930

1,782,827

UNITED STATES PATENT OFFICE

MARCUS A. LAHR, OF TULSA, OKLAHOMA

WHEEL ALIGNER

Application filed March 15, 1929. Serial No. 347,212.

This invention relates to measuring devices for determining the true alignment of vehicle wheels, and has for its object to provide a measuring device which is readily placed in position about the wheels to be aligned and which is provided with scales which are easily adjusted and read to determine the exact position of the wheels relative to each other.

With these and other objects in view which will appear from the description, the invention resides in all the novel features of construction and combination of parts herein disclosed and particularly pointed out in the appended claims.

Figure 1:
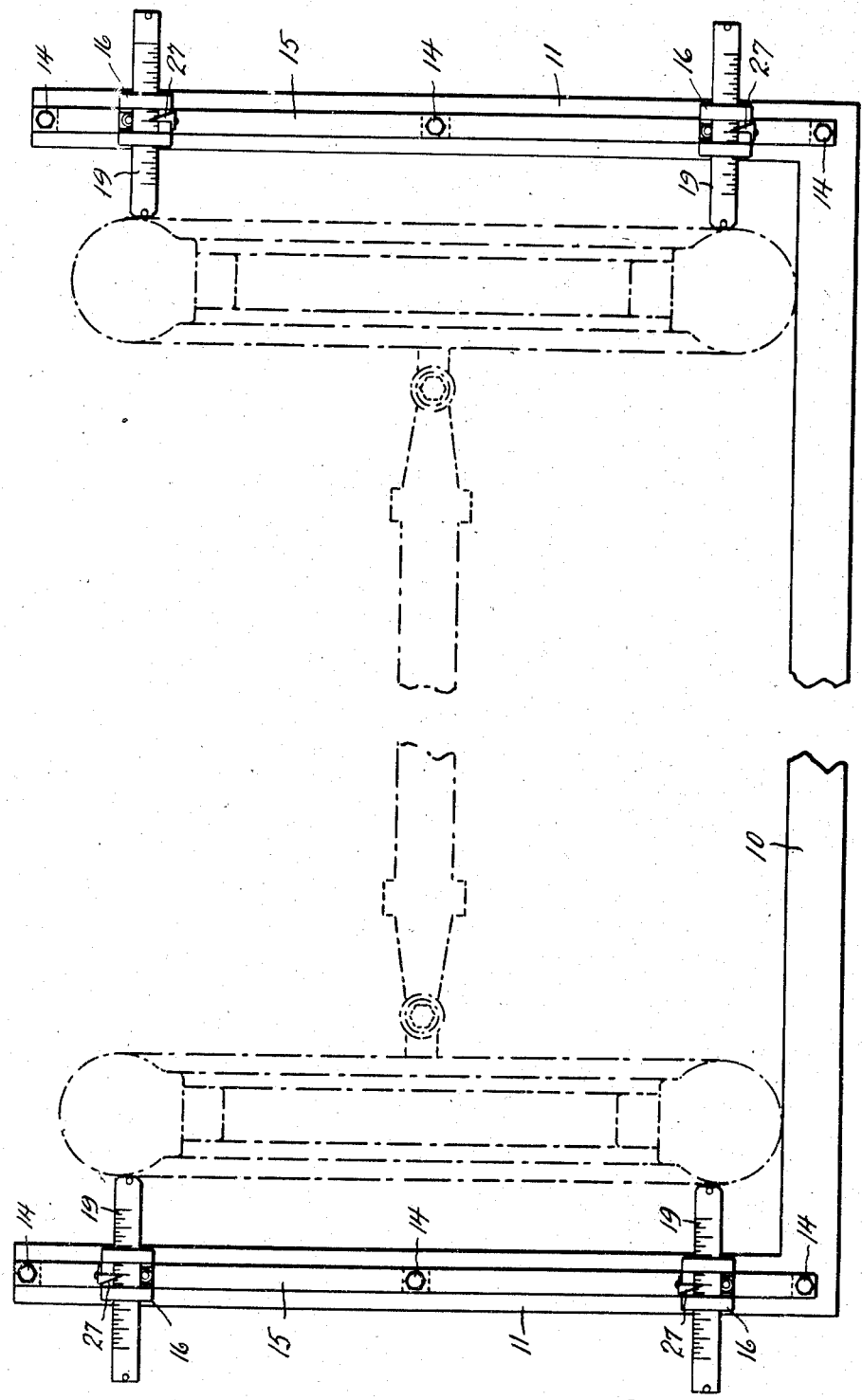
Figure 2:
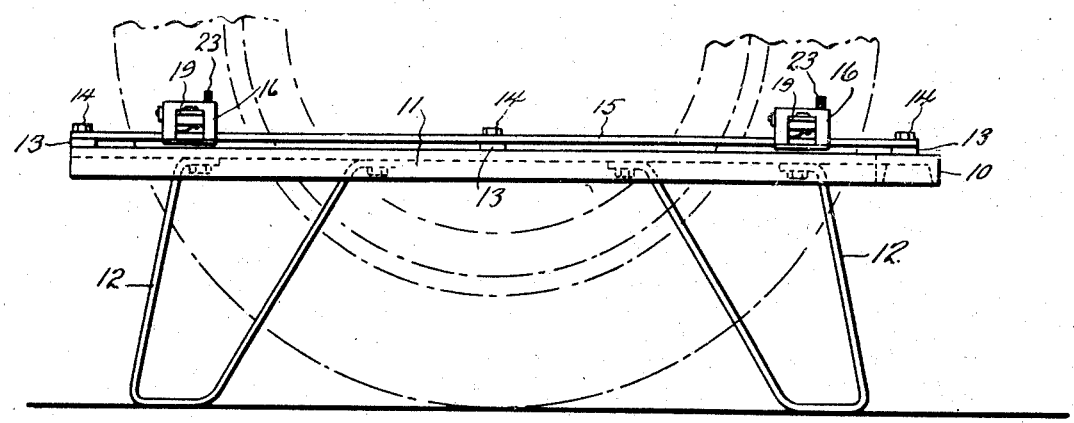
Figure 3:
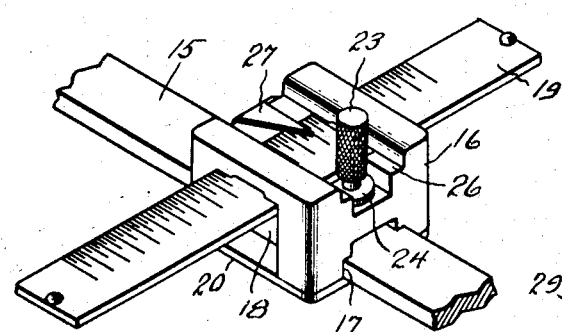
Figure 4:
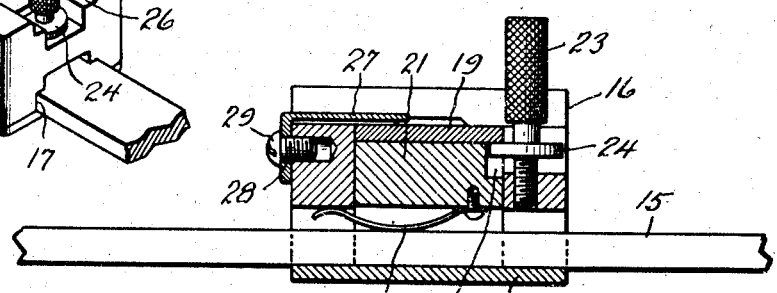
Figure 5:
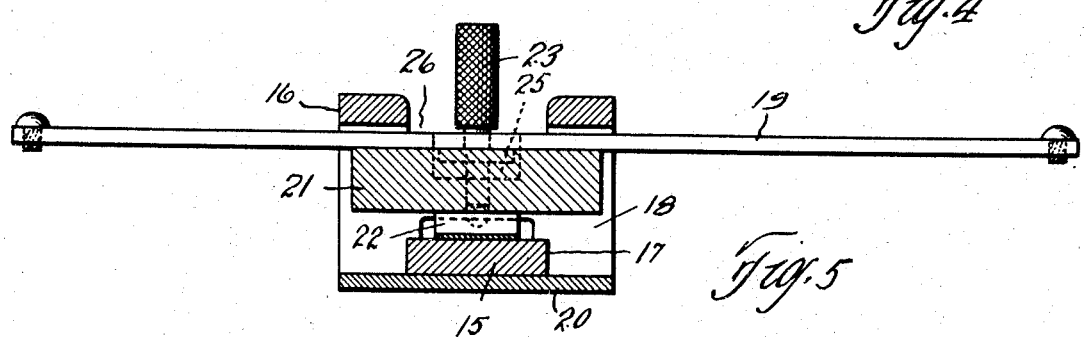
Figure 6:
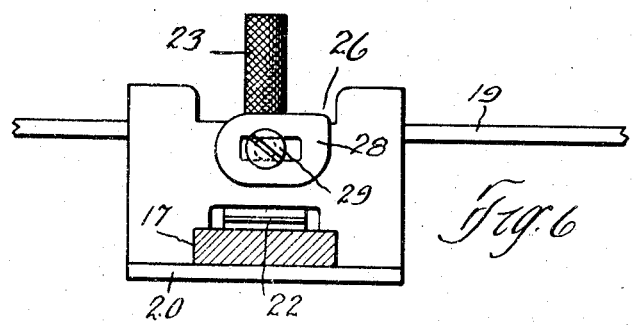

In the drawings Fig. 1 is a top plan view of the wheel aligner in position about the wheels of a vehicle; Fig. 2 is a side elevation of the same; Fig. 3 is a perspective view of the movable scale assembly; Fig. 4 is a central longitudinal section through the sliding block parallel with the bar on which it slides; Fig. 5 is a central transverse section through the sliding block; and Fig. 6 is an end elevation of the block.

In describing the invention, reference is made to the accompanying drawings wherein like reference numerals are used to designate like parts in the several views.

The frame of the wheel aligner comprises a bar 10 preferably of channel iron and long enough to extend slightly beyond the outer edge of the wheels of a vehicle of standard width wheel base, and arms 11 which are integral with or rigidly secured to the ends of the bar 10 and which extend from one side at right angles thereto. These arms are sufficiently long to span a wheel of the largest diameter normally used on automobiles of today. To the bottom of the frame are secured legs 12 for holding it high enough relative to the wheels so that differences in the distance between the front and rear of the wheels may be accurately determined.

Spaced from the top of each arm 11 by blocks 13 and secured thereto by screws 14 is a guide bar 15 on which the scale blocks 16 (two on each) are secured for longitudinal movement therealong. The sliding blocks 16 are each provided on their under face with a longitudinally extending groove 17 in which the bar 15 has a close sliding fit. Transversely through the block and intersecting the groove 17 is a deep groove 18 in which the graduated scale bar 19 has a close sliding fit.

A plate 20 is secured to the bottom face of the block 16 to hold the block on the bar 15. Interposed between the scale 19 and the bar 15 which extends at right angles thereto is a spacing block 21 provided on its bottom face with a leaf spring 22 which resiliently engages the bar 15 and holds the block yieldingly thereon and at the same time holds the scale 19 resiliently in the block 16 so that it will remain in any position of adjustment. A thumb screw 23 threaded into the block 16 at the edge of the scale 19 is provided with an integral flange 24 which extends under the edge of the scale, so that when the screw is turned outward it clamps the scale tightly in the block. At the same time the flange 24 fitting into a groove 25 in spacing block 21 prevents that block from sliding out of its place in the groove 18. The top of the block 16 is longitudinally grooved at 26 so that the top face of the scale 19 is visible therethrough. An adjustable pointer 27 provided with a slotted downturned portion 28 is secured by a screw 29 to the end of the block. The pointer 27 extends onto the graduations of the scale 19 so that it is easily and accurately read.

The operation of the wheel aligner above described is apparent. With the scales 19 moved as far out as possible to assure clearance of the tires therebetween, the frame is placed astride the wheels to be measured with the bar 10 against the front edge of the tire. The scale blocks 16 are moved along the bars 15 until the scales are opposite the large part of the tires. Both scales on one side are then set to the same graduation marks by sliding them through the block 16 and are then locked in that position by the screws 23. With these scales contacting with one tire the scale blocks at the opposite side are adjusted along the bar 15 to the proper position relative to the tire and the scales 19 are slid into contact therewith; the difference in the reading on the front and rear scale gives the amount the wheels are toed in or out. The graduations on the scale are preferably in one-sixteenth of an inch but may be any unit desired. Should the frame for some reason become distorted so the arms are no longer in parallelism the pointers 27 may be moved on the screw 29 to correct for such error, so that the readings on the scales will give the true measurements at all times on wheels of the same diameter.

Having thus described my invention, what I claim is:—

1. A wheel aligner comprising parallel arms, means securing said arms together, scale mounting members slidably secured to one of said arms to move longitudinally therealong, a scale slidably received in each mounting member for longitudinal movement therethrough at right angles to said arm, resilient means for yieldingly holding said scale mounting member in adjusted position on said arm and the scale in adjusted position in said mounting.

2. A wheel aligner comprising parallel arms, means securing said arms together, scale mounting members slidably secured to one of said arms to move longitudinally therealong, a scale slidably received in each mounting member for longitudinal movement therethrough at right angles to said arm, resilient means for yieldingly holding said scale mounting member in adjusted position on said arm and the scale in adjusted position in said mounting, and clamping means for rigidly securing the scale in its adjusted position in said mounting member.

3. A wheel aligner comprising parallel arms, a tie member rigidly securing said arms together, portions of said tie member adjacent said arms being disposed at right angles thereto and in alignment with each other, scale mounting members slidably secured to one of said arms to move longitudinally therealong, a scale slidably received in each mounting member for longitudinally movement therethrough at right angles to said arm, resilient means for yieldingly holding said scale mounting member in adjusted position on said arm and the scale in adjusted position in said mounting.

4. A wheel aligner comprising parallel arms, a tie member to which said arms are rigidly secured, legs on the under side of said arms for holding them in a horizontal plane at a predetermined height relative to the wheels to be aligned, one arm being provided with a longitudinally extending guide, a block slidably mounted for movement along said guide, a scale secured to said block for longitudinal movement at right angles to said arm in a horizontal plane, and resilient means for yieldingly holding the block in adjusted position on said arm, and the scale in adjusted position relative to said block.

5. A wheel aligner comprising parallel arms, a tie member to which said arms are rigidly secured, legs on the under side of said arms for holding them in a horizontal plane at a predetermined height relative to the wheels to be aligned, one arm being provided with a longitudinally extending guide, a block slidably mounted for movement along said guide, a scale secured to said block for longitudinal movement at right angles to said arm in a horizontal plane, and resilient means for yieldingly holding the block in adjusted position on said arm, and the scale in adjusted position relative to said block, said means comprising a spring interposed between said guide and scale urging each of said members against said block.

6. In a wheel aligner having two substantially parallel arms adapted to span opposite wheels on a vehicle, a guide bar secured to one of said arms, a scale block secured to said bar for longitudinal movement therealong, a scale secured to said block for longitudinal movement at right angles to said arm, means for holding the block in adjusted positions on said bar and for holding the scale in adjusted positions relative to the block, a pointer on said block with respect to which the scale is read, said pointer being adjustable relative to the block whereby misalignment of the arms may be compensated for.

7. In a wheel aligner having an arm adapted to span wheels of different diameters, a guide bar secured to said arm, a scale block secured to said bar for longitudinal movement therealong, a scale secured to said block for longitudinal movement at right angles to said arm, a spring interposed between the bar and said scale and held in said block for yieldingly holding the block in adjusted positions on the bar and the scale in adjusted positions relative to the block.

8. In a wheel aligner having an arm adapted to span wheels of different diameters, a guide bar secured to said arm, a scale block secured to said bar for longitudinal movement therealong, a scale secured to said block for longitudinal movement at right angles to said arm, a spring interposed between the bar and said scale and held in said block for yieldingly holding the block in adjusted positions on the bar and the scale in adjusted positions relative to the block, and means for clamping the scale fixedly in said block.

9. In a wheel aligner having an arm adapted to span wheels of different diameters, a guide bar secured to said arm, a scale block secured to said bar for longitudinal movement therealong, a scale secured to said block for longitudinal movement at right angles to said arm, a spring interposed between the bar and said scale and held in said block for yieldingly holding the block in adjusted positions on the bar and the scale in adjusted positions relative to the block, and a screw threaded in said block having a portion contacting with the scale for fixedly clamping the scale thereto.

10. In a wheel aligner having an arm adapted to span wheels of different diameters, a guide bar secured to said arm having portions spaced therefrom, a sliding block provided with a longitudinal passage through which the bar passes, the block being movable therealong, said block being also provided with a transverse passage, a scale member received therein and longitudinally adjustable therethrough at right angles to said bar, and resilient means interposed between said scale and bar for urging them apart and into yielding contact with the opposed faces of the respective passages in the block through which they have relative movement.

11. In a wheel aligner having an arm adapted to span wheels of different diameters, a guide bar secured to said arm having portions spaced therefrom, a sliding block provided with a longitudinal passage through which the bar passes, the block being movable therealong, said block being also provided with a transverse passage, a scale member received therein and longitudinally adjustable therethrough at right angles to the said bar, a movable spacing member in the block between said bar and scale member, and a spring secured thereto and bearing against said bar for yieldingly holding said spacing member against the scale and for urging said scale into contact with the opposite face of the passage in which it moves, and the opposite face of the passage through which the bar has relative movement into yielding contact with said bar, to yieldingly hold the parts in various positions of adjustment.

12. In a wheel aligner having an arm adapted to span wheels of different diameters, a guide bar secured to said arm having portions spaced therefrom, a sliding block provided with a longitudinal passage through which the bar passes, the block being movable therealong, said block being also provided with a transverse passage, a scale member received therein and longitudinally adjustable therethrough at right angles to said bar, and resilient means interposed between said scale and bar for urging them apart and into yielding contact with the opposed faces of the respective passages in the block through which they have relative movement, and a screw member for rigidly holding the scale in adjusted position.

13. In a wheel aligner having an arm adapted to span wheels of different diameters, a guide bar secured to said arm having portions spaced therefrom, a sliding block provided with a longitudinal passage through which the bar passes, the block being movable therealong, said block being also provided with a transverse passage, a scale member received therein and longitudinally adjustable therethrough at right angles to the said bar, a movable spacing member in the block between said bar and scale member, a spring secured thereto and bearing against said bar for yieldingly holding said spacing member against the scale and for urging said scale into contact with the opposite face of the passage in which it moves, and the opposite face of the passage through the bar has relative movement into yielding contact with said bar, to yieldingly hold the parts in various positions of adjustment, and a thumb screw in said block provided with a circular flange engaging under said scale whereby the scale may be clamped in any adjusted position.

14. In a wheel aligner having an arm adapted to span wheels of different diameters, a guide bar secured to said arm having portions spaced therefrom, a sliding block provided with a longitudinal passage through which the bar passes, the block being movable therealong, said block being also provided with a transverse passage, a scale member received therein and longitudinally adjustable therethrough at right angles to the said bar, a movable spacing member in the block between said bar and scale member, a spring secured thereto and bearing against said bar for yieldingly holding said spacing member against the scale, and a thumb screw in said block provided with a flange engaging under said scale for clamping the scale against the top of its passage, said spacing member having portions cooperating with said screw to maintain it in position in said block.

In testimony whereof, I hereunto affix my signature.

MARCUS A. LAHR.